ERHARD K. KIETZ &
JOHN F. VARNELL JR.
INVENTORS

BY Nathan N. Kallman

ATTORNEY

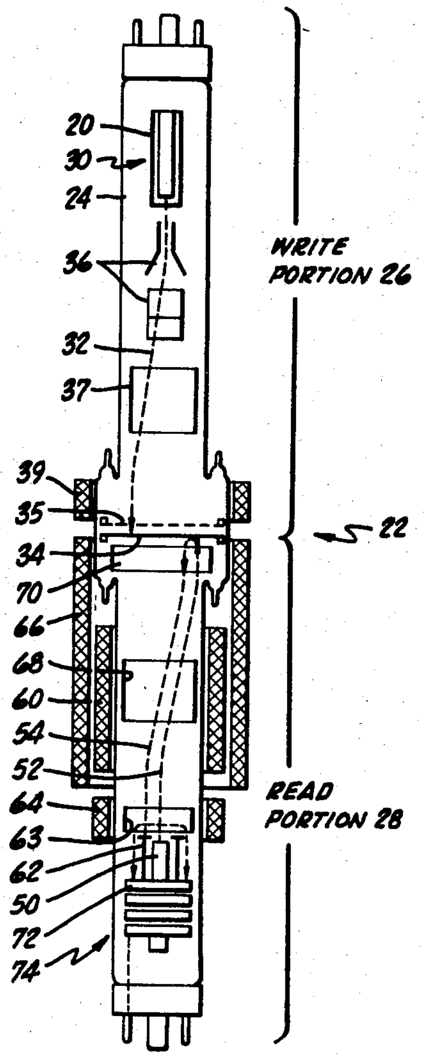
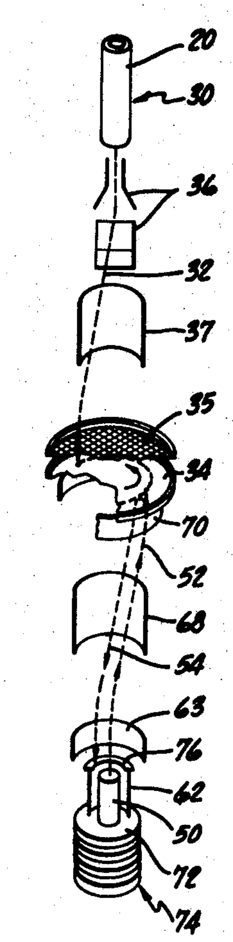
FIG. 3
FIG. 2
ERHARD K. KIETZ &
JOHN F. VARNELL JR.
INVENTORS
BY Nathan N. Kallman
ATTORNEY

United States Patent Office 3,131,384

RECORDING AND REPRODUCING SYSTEM

Erhard K. Kietz and John F. Varnell, Jr., Menlo Park, Calif., assignors to Ampex Corporation, Redwood City, Calif., a corporation of California Filed Aug. 29, 1960, Ser. No. 52,671
9 Claims. (Cl. 340—174.1)

This invention relates to recording and reproducing systems, and in particular to an improved electronic timing control method and means utilized with a recorder and reproducer to compensate for any time base error which may appear during the record or reproduce modes.

For the purpose of explanation, the application will be directed to a magnetic tape recording and reproducing system. However, it is to be understood that the invention as applicable generally to any system which stores and reproduces intelligence.

As is well known, a magnetic recording system includes a transducing means, such as a magnetic recording head, and a movable magnetic medium such as a magnetic tape, which is transported adjacent to the transducing means. An electrical signal representing an information signal to be recorded is applied to the transducing means and is transferred to the magnetic medium to be stored in the form of a magnetic flux pattern.

To reproduce the information signal, the magnetic tape is moved across a transducing means such as a magnetic reproducing head, so that the recorded magnetic flux pattern produces an electrical signal that may be amplified and processed for transmission. The quality and fidelity of the reproduced signal are dependent upon the uniformity of the record and reproduce conditions. Any nonuniformity may result in time base error and signal distortion. Such nonuniformity may arise from variations in the speed of the magnetic tape as it passes the recording or reproducing head. Various mechanical deficiencies such as changes in the speed of the driving mechanism or capstan due to cogging or hunting, walking bearing, changes in tape pressure and tape tension may cause these undesirable variations in the speed of the moving tape.

Generally, the velocity of a magnetic tape relative to a magnetic head may be controlled by servomechanism systems which reduce the time base displacement during the record and playback modes. Although presently known servo systems are capable of maintaining an average velocity of a moving magnetic tape relative to a magnetic head substantially constant, the instantaneous velocity may vary over narrow limits resulting in an appreciable time base displacement. This displacement may be notably objectionable when recording and reproducing information signals, such as monochrome and color television signals for example. Furthermore, servo systems and the necessary associated electronics are costly, complicated, and require time-consuming maintenance. It is therefore desirable to provide during playback an improved means for compensating for erratic variations in tape speed that occur during the record and playback modes.

An object of this invention is to provide an improved recording system having an electronic timing control device.

Another object of this invention is to provide a time base compensation system which compensates, during reproduction of a recorded information signal, for erratic variations in phase or frequency of such information signal.

Another object is to provide an electronic timing control device which may be utilized to negate timing errors introduced during the recording or reproduction of an information signal.

According to this invention, a recording and reproducing system incorporates a continuously variable electronic timing control device which compensates for timing errors by varying the instantaneous rate of reproduction of a recorded information signal in accordance with such timing errors generated during the record-reproduce process. During the decoding mode, a pilot reference signal is recorded onto a moving storage medium simultaneously with an information signal. Any variation from a standard speed by the moving storage medium causes timing errors which affect the phase and frequency of the recorded reference and information signals, in the same manner. During the reproduce mode, the recorded reference signal, having the same timing errors as the recorded information signal, is applied to the electronic timing control device and utilized to control the rate of reproduction of the recorded information signal so that any timing errors developed during the record-reproduce process are effectively negated.

In a particular embodiment of the invention, a magnetic recorded and reproducer includes an electronic write-read scanning tube. A writing beam, which is intensity-modulated by the recorded information signal, tracks a continuous path on a storage target and produces a charge pattern representative of the signal information. The position and speed of the writing beam is controlled by the phase and frequency of a pilot reference signal and is varied in accordance with spurious timing changes, i.e., phase and frequency changes during record-reproduce, so that timing errors do not appear in the reproduced signal. A reading beam, which tracks a similar continuous path on the storage target, senses the stored charge pattern and converts the stored information to an electrical signal current for readout. The scanning speed of the reading beam is maintained constant in accordance with a standard pilot reference signal whereby time base errors are substantially eliminated during reproduction of the original information input signal.

The invention will be described in greater detail with reference to the drawing in which:

FIGURE 2 is a schematic diagram of an electronic timing control device, according to the invention; and FIGURE 3 is a perspective view, in breakaway, of the electrodes of the electronic device, illustrated for clarity of explanation.

Figure 1:
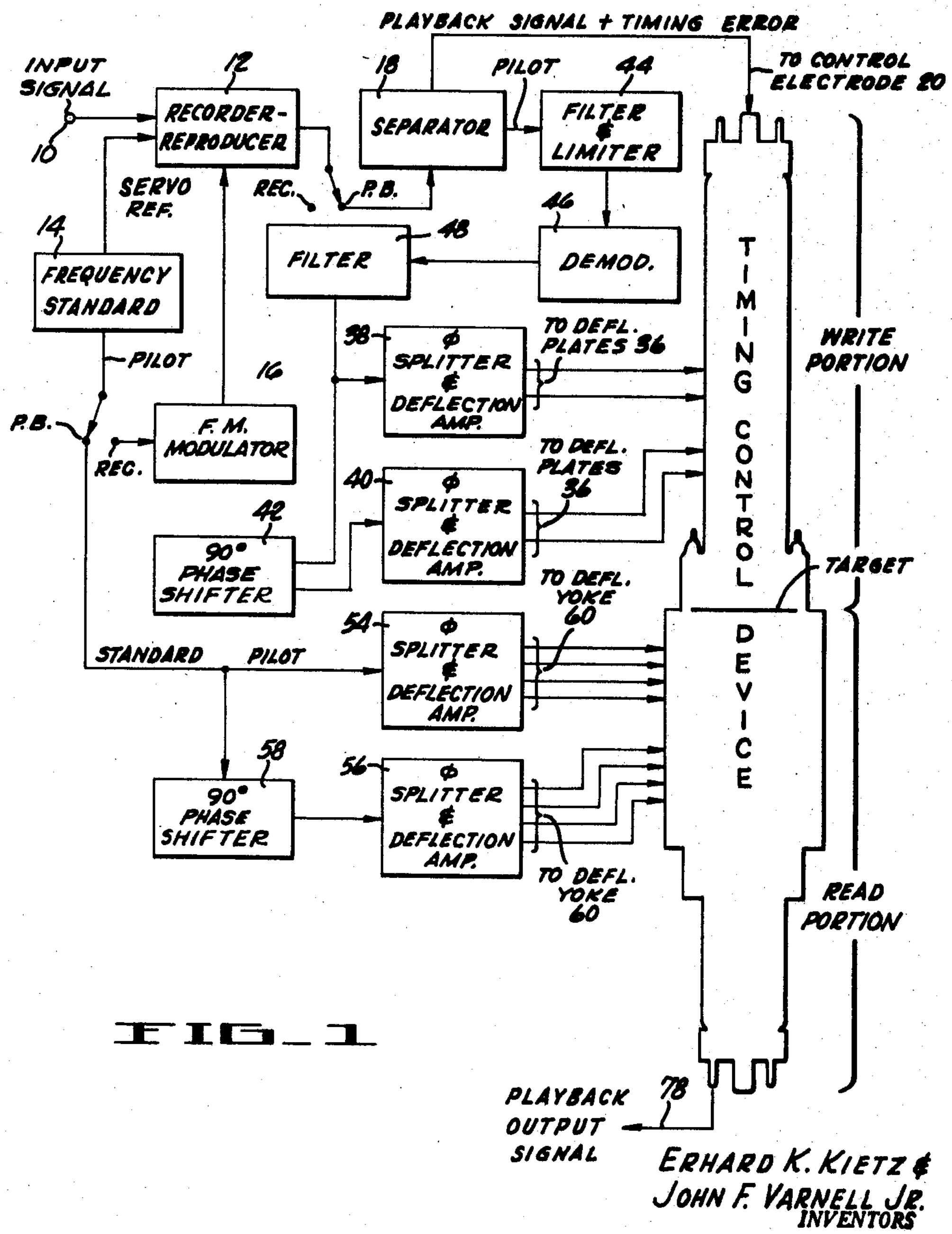
FIGURE 1 is a block diagram of a recording and reproducing system, in accordance with the invention.

In FIGURE 1, an information input signal 10 is supplied to and recorded by a storage medium 12, which may be a magnetic tape recorder and reproducer for example. Simultaneously, a pilot reference signal generated by a frequency standard 14, such as a crystal oscillator, is applied in conjunction with the information input signal 10 to the recorder-reproducer 12 through an FM modulator 16. The modulator 16 supplies a carrier wave, which may be a 10 megacycle signal, that is frequency modulated by the pilot reference signal which may be in the order of 100 kilocycles, for example. The modulated signal is simultaneously recorded with the information signal on a single recording track. It is noted that as an alternative to additively combining the reference signal and the information signal on one track, separate recording tracks may be employed for each of these signals. However, separate transducers in very close spaced relationship are required to record separate tracks so that tape stretch and skewing would not affect the time relationships of the separately recorded signals. Any time base variations which are registered with the information signal as a result of changes in tape speed during recording and reproducing of the information signal also affect the pilot reference signal to the same extent.

For example, if the recording tape were to move at a slower speed than a predetermined standard recording speed for any minute time interval, the information signal and the pilot reference signal recorded during that time both would be packed more densely on a given area of the recording tape. Whereas, only one cycle of the pilot signal waveform may be recorded in a given distance *d* of the tape under ideal conditions, more than one cycle of the pilot signal waveform would appear on the tape in the same distance *d*, if the tape were to be transported more slowly than at a standard speed relative to the transducing means. Similarly, more total information signal representing a longer input period would appear in the same distance *d* of the tape when there is a slowdown of the tape than when the recording system is moving ideally at a uniform standard rate. Thus, during playback, if there were no compensation for any time base error, an ideal reproducer wherein the recorded tape moves at a uniform standard speed would provide an output signal having distorted phase and frequency characteristics when reproducing the information recorded along the distance *d* of the tape.

As is well known in the art, a servo mechanism system may be coupled between the frequency standard 14 and the recorder-reproducer 12 to correct for changes in phase or speed of the moving mechanisms of the recorder-reproducer. However, a servo system does not effectively eliminate all the instantaneous time base errors which may occur during the record-reproduce operation. In accordance with the invention, a record-reproduce system utilizes an electronic write-readout device which is controlled by the pilot reference signal. Time base errors that appear as a result of instantaneous erratic changes in the speed of the tape relative to the transducing means, angle modulate or vary the phase and the frequency of the pilot signal during both record and reproduce operation. In turn, the reproduction of the information signal by the electronic device is time-controlled by the pilot signal thereby compensating for time base error in the reproduced signal.

With reference to FIGURES 1, 2 and 3, with a switch 17 in playback position, the composite recorded signal is obtained from the recorder-reproducer 12, and separated by a separator 18 into a playback information signal component and a pilot reference signal component. The information signal component, including any time base error, is applied directly to the input or control electrode 20 of an electronic timing control device 22, hereinafter referred to as a cyclochron.

The cyclochron 22 comprises an evacuated glass envelope 24 having a write portion 26 and a readout portion 28. The write portion 26 may comprise part of a cathode ray tube having an electron gun 30 including the control electrode 20 for producing an electron writing beam 32. The writing beam 32 is intensity-modulated by the playback signal applied to the control electrode 20 and is directed to a storage target 34 which stores a charge pattern corresponding to the playback signal. The storage target 34 may comprise a storage screen such as generally found in storage type tubes, which may be a very thin insulator sheet, such as a glass membrane, having a suitable resistivity and capacity. The storage target allows charge migration between both surfaces so that potential variations established on the writing side appear on the reading side with about the same magnitude. Operating above the first crossover potential, the high velocity writing beam 32 strikes the target 34 and causes secondary electron emission. Spaced from the electron gun 30 and disposed closely adjacent to the target 34 is a fine wire mesh or screen electrode 35 which is maintained at a slightly positive potential, about 2 volts for example, relative to the target 34. The mesh 35 serves as a collector of the secondary electrons which are emitted from the target 34. The target electron charge deposited on the target elements varies with the intensity of the modulated writing beam 32, and the target elements shift their potentials by different amounts as the target 34 is scanned. Those elements receiving signal information are driven positive in proportion to the intensity of the modulated electron beam as it strikes the target. In this manner, a pattern of potential variations is established on the target surface corresponding to the playback signal.

Along the path of the writing beam 32 are vertical and horizontal deflection electrodes 36 of an orthogonal deflection system which deflect the beam 32 to provide a continuous uninterrupted scan having a Lissajous pattern, such as a circular trace for instance. An accelerating electrode 37, deposited on the inner surface of the tube envelope 24, has a voltage such that a high velocity is imparted to the electrons of the writing beam 32. Alignment of the electron beam 32 relative to the target 34 is achieved by alignment coils 39 so that the electrons arrive in a path perpendicular to the target. Furthermore, the alignment coils 39 prevent undesirable deflection of the writing beam 32 by extraneous magnetic fields.

Instrumental in developing the scanning pattern are phase splitters and deflection amplifiers 38 and 40 having substantially equal output amplitudes coupled to the deflection electrodes 36. By coupling a 90° phase shifter 42 to the input of the phase splitter 40, sine waves 90° out of phase with each other are supplied to the electrodes 36 so that a substantially circular deflection pattern may be traced on the target 34.

The position and speed of the writing beam 32 in its circular path is controlled by the phase and frequency of the pilot reference signal component which is derived from the composite recorded signal during playback. For example, for each cycle of the pilot signal one scanning revolution may be made. To accomplish this, the modulated carrier wave including time base errors is separated from the information signal by the separator 18 and is passed through a filter and limiter 44. The filter reduces any interference that may be caused by the playback signal, whereas the limiter eliminates amplitude fluctuations and improves the signal-to-noise ratio. The pilot signal is then demodulated by a frequency discriminator 46 which removes the carrier and the pilot signal is further processed by a noise filter 48 to eliminate spurious components and harmonics. From the filter 48, the pilot signal containing time base errors in the form of phase modulation is applied to the phase splitter 38, and the phase shifter 42 and splitter 40 to control the deflection characteristic of the writing beam 32.

As the pilot signal includes a series of instantaneous timing errors such as may be found with the information playback signal, the writing beam 32 may be delayed or accelerated in accordance with variations in the phase or frequency of the pilot signal which appear whenever the timing errors occur. The effect of the variations in the scanning speed of the writing beam 32 caused by the changes in phase and frequency of the pilot signal is to compensate for the erratic timing errors that were developed during recording or reproducing. In other words, the presentation of information at the target 34 by the modulated write beam 32 correlates in relative time to the presentation of the information input signal to the storage medium 12 during the record process.

To reproduce the information deposited on the target 34, the readout portion 28 of the cyclochron 22 is utilized having an electron gun 50 for producing an electron reading beam 52. Reading is accomplished by scanning the thin glass storage target 34 with the electron reading beam 52. The electron beam 52 scans the target with very low energy primary electrons which are either entirely reflected from the target 34 where there has been no signal deposited thereon, or are attracted to those target elements which have been shifted slightly positive during the writing process. The reading beam 52 traces the same continuous circular pattern as the writing beam 32 from the other side of the target 34 and trails the writing beam by an average angle of approximately 180°.

To provide the deflection waveform signal for the reading circular trace, the standard pilot reference signal is derived from the frequency standard 14 and applied to phase splitters and deflection amplifiers 54 and 56. The pilot reference signal is applied to the splitter and amplifier 56 through a 90° phase shifter 58 in the same manner as described with respect to the write beam to provide sine waves to deflection coils or yoke 60. The deflection yoke 60 deflects the reading scan beam 52 into a circular path having substantially the same diameter as the circle defined by the write scan beam 32. Since the scanning frequency of the reading beam 52 is controlled by the standard pilot reference signal generated by the frequency standard 14, the circular scanning speed of the reading beam 52 remains substantially constant.

As a result of the high capacity between both surfaces of the very thin target 34, the potential variations established on the writing surface of the target 34 appear on the readout side with almost the same magnitude. The low velocity reading scan beam 52 is directed from the gun 50 towards the reading surface of the target 34, and is acted upon by an alignment coil 64, the deflection yoke 60, a focusing coil 66, an accelerating electrode 68 coating a portion of the inner wall of the readout section, and a decelerating electrode 70, in a well known manner. Because the low velocity reading beam 52 operates below the first crossover potential, the beam deposits electrons on the positively charged elements of the target 34 thereby effectively neutralizing the charge. As a result of charge leakage between the writing surface and the reading surface, and the neutralization by the reading beam, the information, pattern is effectively erased. As part of the erasing process, the target 34 is driven to the potential of the cathode of the readout electron gun 50 as a result of the deposition of electrons by the reading beam. In addition, after striking the target 34, the reading beam 52 becomes modulated in accordance with such electron loss to the relatively positive information-carrying target elements. The modulated reading beam electrons are reflected toward the electron gun 50 along a substantially similar path as that traversed by the scanning electrons of the reading beam 52. Thus, an amplitude modulated return beam 54 is caused to scan a small area of a first dynode 62 of an electron multiplier assembly 74 associated with the reading electron gun 50. The surface 76 of the first dynode 62 is coated with a material having a high secondary emission characteristic, therefore allowing secondary electrons to be emitted when the return beam strikes such surface 76 of the first dynode. The secondary electrons are accelerated toward the electron multiplier 74 by the action of the grid 63, which is negative relative to the dynode 62, towards a relatively positive second dynode 72 in the electron multiplier 74. The second dynode 72 also has a high secondary emission characteristic and amplifies the electron flow which is representative of the modulated return electron beam 54 containing the playback information signal. By means of several dynodes, the multiplier 74 serves to develop an amplified signal current which may read out as a playback output signal 78 having no timing errors and which corresponds substantially to the input signal 10.

To provide for complete erasure of the deposited charge pattern on the target 34 so that new information may be written by the writing beam 32, the focusing coil 66 provides a field which confines the reading beam size to an area substantially the same as that defined by the charged circular pattern established by the writing beam. Also to facilitate tracking of the circular pattern of written information, the reading beam may be diffused in a radial direction by electron lens means, or by utilizing a low intensity, high frequency signal together with the deflecting signal.

In another embodiment of the invention, a circular target may be utilized having about 5,000 conducting wire elements penetrating a glass insulator. The write beam can make one revolution in every 10 microseconds, so that each element is scanned in the time of 2 millimicroseconds, which provides a high order resolution.

It is understood that the invention is not limited to the values specified in the description, or to the particular electronic timing device shown herein by way of example. Any electronic device which is capable of controlling the writing and reading time relationships of a stored signal in accordance with timing errors may be utilized in the record-reproduce system of the invention. For example, a screen electrode or wire mesh may be employed as a target in lieu of a glass sheet and a separate erasing beam may be utilized to neutralize the deposited charge pattern. It is also noted that power and voltage supplies have not been illustrated for simplicity and clarity in the drawing and specification.

There has been described herein a recording and reproducing system wherein an electronic timing device controls the speed of reproduction of a recorded information signal having timing errors therein, with the aid of a pilot timing signal simultaneously recorded with the information signal and having the same errors. An important feature of this invention is that an improved signal-to-noise ratio and reduced signal distortion are provided with simple electronics.

What is claimed is:

1. A recording and reproducing system subject to time base errors having means for simultaneously recording an information signal and a pilot timing signal so that both said signals are similarly angle modulated by such time base errors comprising: an electronic timing control device having a target disposed between a writing portion and a reading portion; means for applying said angle modulated recorded information and timing signals to said writing portion so that the writing speed of said information signal on said target is controlled in accordance with said angle modulated timing signal; and means for applying said pilot timing signal without such angle modulation to said reading portion so that said information signal is reproduced from said target substantially without any time base errors.

2. A recording and reproducing system subject to time base errors having means for simultaneously recording an information signal and a pilot timing signal so that both said signals are similarly angle modulated by such time base errors comprising: a cyclochron vacuum tube having a target disposed between a writing portion and a reading portion; means for applying said angle modulated recorded information and timing signals to said writing portion so that the writing speed of said information signal on said target is controlled in accordance with said angle modulated timing signal; and means for applying said pilot timing signal without such angle modulation to said reading portion so that said information signal is reproduced from said target substantially without any time base errors.

3. A recording and reproducing system comprising: means for recording an information signal onto a storage medium; means for recording a reference signal onto said medium simultaneously with said information signal, said recording information signal and said reference signal each including any same timing error variations to the same degree; means for continuously writing said information signal derived from said medium onto a target; means for varying the speed of such continuous writing of said information signal in accordance with said timing variations; and scanning means for continuously reading said written signal information from said target at a constant speed.

4. A system as in claim 3 wherein said writing means and said reading means define congruent continuous patterns on said target.

5. A system as in claim 4 wherein said patterns are substantially circular in form.

6. A system as in claim 5 wherein said reading means lags said writing means by an average angle of 180°.

7. A system as in claim 3 wherein said reading means provides erasure of said written signal on said target.

8. In a system for reproducing a recorded information signal having angle modulation caused by time base errors during a record-reproduce operation, an electronic timing control device having a storage target comprising: means for continuously writing a charge pattern representing said information signal on one surface of said target; means for applying a reference pilot signal having the same angle modulation as said information signal to said writing means so that the speed of writing is varied in accordance with said angle modulation; means for continuously reading said charge pattern by scanning the opposite surface of said target; and means for applying said reference pilot signal to said reading means without any angle modulation so that said reading progresses at a standard predetermined speed.

9. A recording and reproducing system comprising: means for recording an information signal on a storage medium, said recording means being subject to time error variations whereby said information signal is angle modulated; means for generating a reference pilot signal for application to said recording means; means for applying said reference pilot signal to said recording means to be simultaneously recorded on said storage medium with said information signal, and subject to such angle modulation; means for reproducing said recorded signals; means for separating said reproduced modulated pilot and information signals; an electronic timing control device having a storage target disposed between a writing portion and a readout portion, said writing portion providing a writing electron beam for continuously depositing a charge pattern on said target representative of said signal information, said readout portion providing a reading electron beam for reading and erasing said charge pattern; means for applying said separated information signal to said writing portion for intensity modulating said writing beam; means for deflecting said writing beam in a circular trace on said target; means coupled to said writing beam deflection means for applying said separated pilot signal having angle modulation to said deflecting means to vary the speed of said writing beam in its deflected circular path in accordance with said angle modulation; means for deflecting said reading beam in a circular trace congruent with said writing beam trace on said target; and means for applying said generated reference pilot signal to said reading beam to maintain said reading beam in its circular path at a substantially constant speed.

References Cited in the file of this patent

UNITED STATES PATENTS

| | | |
|---|---|---|
| 2,807,797 | Shoemaker | Sept. 24, 1957 |
| 2,957,140 | Harris | Oct. 18, 1960 |
| 2,957,167 | Parrack | Oct. 18, 1960 |
| 2,984,790 | Mallebrein | May 16, 1961 |
| 3,046,431 | Nicholson | July 24, 1962 |

OTHER REFERENCES

Pensak, L.: The Graphechon—a Picture Storage Tube, The RCA Review, March 1949. (Copy in Div. 41.)